(12) United States Patent
Svejkovsky et al.

(10) Patent No.: US 8,128,096 B2
(45) Date of Patent: Mar. 6, 2012

(54) MECHANICAL SEAL ASSEMBLY

(75) Inventors: Reinhard Svejkovsky, Geretsried (DE); Wolfgang Ries, Eschenlohe (DE); Peter Kachler, Pullach (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 458 days.

(21) Appl. No.: 12/227,105

(22) PCT Filed: Mar. 14, 2007

(86) PCT No.: PCT/EP2007/002268
§ 371 (c)(1),
(2), (4) Date: Apr. 29, 2009

(87) PCT Pub. No.: WO2007/137641
PCT Pub. Date: Dec. 6, 2007

(65) Prior Publication Data
US 2010/0013166 A1 Jan. 21, 2010

(30) Foreign Application Priority Data
May 31, 2006 (DE) .................. 20 2006 008 633 U

(51) Int. Cl.
F16J 15/34 (2006.01)
F16J 15/38 (2006.01)
F16J 15/36 (2006.01)
(52) U.S. Cl. .................. 277/372; 277/390; 277/393
(58) Field of Classification Search .......... 277/370–373, 277/390, 393
See application file for complete search history.

(56) References Cited

U.S. PATENT DOCUMENTS
2,375,985 A * 5/1945 Freeman ............ 277/397
(Continued)

FOREIGN PATENT DOCUMENTS
DE 1 675 200 * 12/1970
(Continued)

OTHER PUBLICATIONS
International Search Report dated Jun. 8, 2007.*
(Continued)

*Primary Examiner* — Thomas Beach
*Assistant Examiner* — Nicholas L Foster
(74) *Attorney, Agent, or Firm* — Scott D. Wofsy; Edwards Wildman Palmer LLP

(57) ABSTRACT

A mechanical seal assembly to be used in sterile applications comprises a pair of co-operating seal rings (2, 5), one of which is held rotationally fixed and the other of which is provided to rotate together with a rotating component, wherein one of the seal rings is axially movable and biased by a spring against the other seal ring, a retainer housing (1) at which the rotating seal ring is retained near an axial end thereof, a mounting member (12) which may be mounted rotationally fixed at the rotating member, and a rotatory force transmission device (10) for transmitting a rotatory force between the mounting member and the retainer housing. The rotatory force transmission device (10) comprises a transmitting ring (15) retained in press-fit at the retainer housing (1) near the other axial end thereof, the transmitting ring including at least one protruding engagement member (20) engaging in an aligned recess in the mounting member. The retainer housing may therefore feature a desired smooth outer periphery without any dead spots.

12 Claims, 1 Drawing Sheet

U.S. PATENT DOCUMENTS

Figure 1:
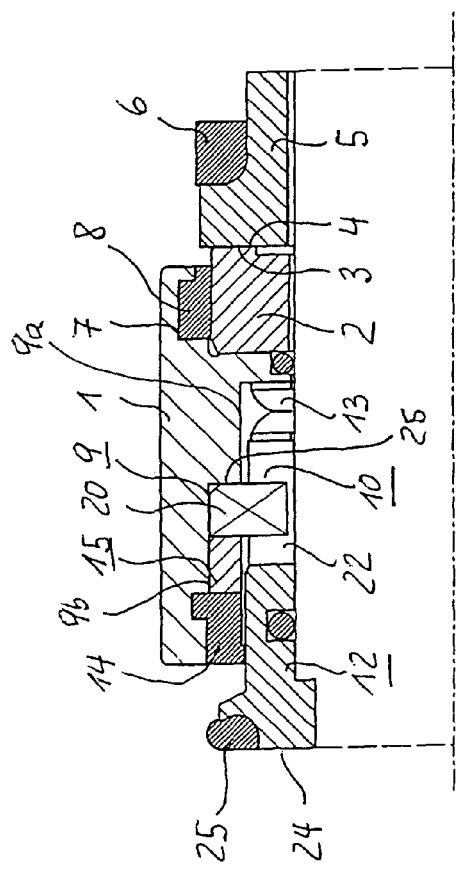

| | | | | |
|---|---|---|---|---|
| 3,117,793 A * | 1/1964 | Hauser et al. | | 277/372 |
| 3,479,039 A * | 11/1969 | Pinkas | | 277/398 |
| 3,889,960 A * | 6/1975 | Wiese | | 277/397 |
| 3,953,038 A * | 4/1976 | Ludwig | | 277/384 |
| 4,213,618 A * | 7/1980 | Thurber | | 277/373 |
| 6,220,601 B1 * | 4/2001 | Keller et al. | | 277/381 |
| 6,247,545 B1 * | 6/2001 | Burr et al. | | 175/371 |
| 6,655,694 B1 * | 12/2003 | Nakano | | 277/370 |
| 2005/0077685 A1 * | 4/2005 | Roddis et al. | | 277/390 |
| 2006/0061041 A1 * | 3/2006 | Huang | | 277/370 |

FOREIGN PATENT DOCUMENTS

| | | | |
|---|---|---|---|
| DE | 258273 A1 | * | 7/1988 |
| DE | 298 00 712 U1 | * | 6/1999 |
| DE | 299 03 419 U1 | * | 6/1999 |
| DE | 202 02 177 U1 | * | 5/2002 |
| EP | 1 357 319 A2 | * | 10/2003 |

OTHER PUBLICATIONS

German Search Report dated Jan. 18, 2007.*

* cited by examiner

MECHANICAL SEAL ASSEMBLY

The invention relates to a mechanical seal assembly.

In particular, the invention relates to an enhancement of mechanical seal assemblies to be used in sterile methods, e.g. medical engineering or food processing. In applications of that kind, often the sealing of fluids having a particularly high degree of purity is concerned, as e.g. ultra-pure water, in which the mechanical seal assembly should not affect the degree of purity. An effective measure in this sense is to avoid deposits at the regions of the mechanical seal assembly exposed to the fluid as far as possible, e.g. the avoidance of dead spots.

In the context of mechanical seal assemblies, it is known to mount one of the co-operating seal rings in a retainer housing which in turn caused to rotate together with a mounting ring due to the mounting ring being rotationally fixed onto a rotating component, and which may simultaneously be moved axially relative to the mounting ring (DE 1 675 200 A). In order to transmit a rotatory force between the components, one or more pin-shaped round engaging members may be inserted into the retainer housing, the engaging members projecting radially and engaging into recesses in the mounting ring (DE 202 02 177 U). The attachment of the pin-shaped engaging members may be performed by welding. Thereafter, a metal-cutting post-processing of the retainer housing is required, in order to eliminate parts of the engaging members projecting excessively to the outside. However, it cannot be excluded that minute dead spots remain, in which deposits may form. For a sterile application, it is further disadvantageous that welding should be avoided for the materials used in sterile applications for the mechanical seal assembly having a very low ferrite content, since therewith the ferrite content could be increased in an inadmissible manner. Finally, the pin-shaped engaging members result in a line contact of the regions involved in the transmission of the rotatory force, which may result in wear and abrasion.

In view of the mentioned drawbacks, it is an object of the invention to provide an enhanced mechanical seal assembly of the aforementioned kind having a specific applicability for use in sterile applications.

This object is solved by patent claim 1. An advantage of the provision of a transmitting ring press-fit into the retainer housing and including protruding engagement members is that in this way, welding may be omitted and no projections occur at the outside of the retainer housing which would require a careful metal-cutting post-processing. Further, due to the invention, no increase of the ferrite content of the materials of the mechanical seal assembly occurs. The retainer housing may feature a desired smooth outer periphery without any dead spots. The protruding engagement members may constitute integral components of the transmitting ring, in a manner which is easy to realize in terms of product engineering, and may preferably have an outline which enables a plane engagement with adjacent portions of the recesses in the mounting member, in order to eliminate or minimize abrasion due to wear. The provision and the assembly of the mechanical seal assembly prove to be easier compared to the known constructions.

Figure 3:
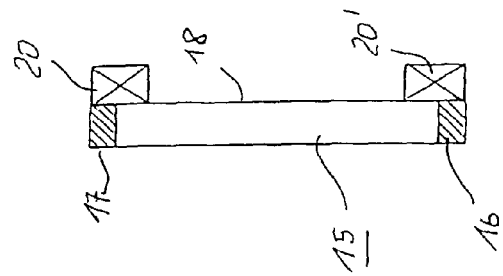
Figure 2:
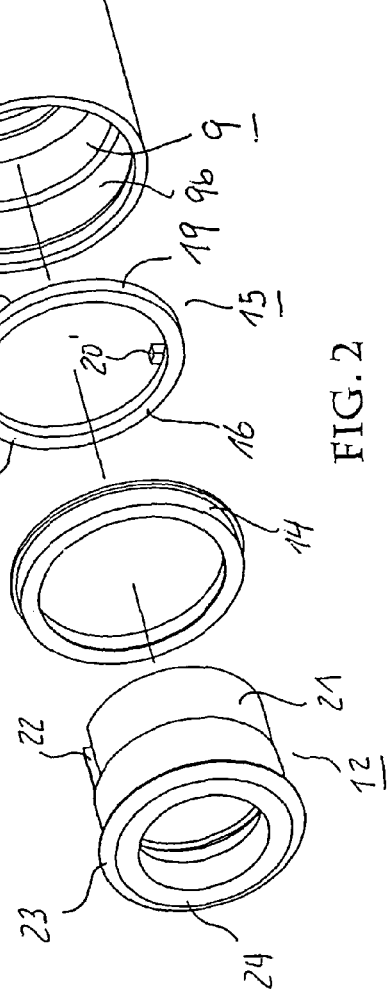

In the following, the invention is explained in detail on the basis of an embodiment and the drawing, in which:

FIG. 1 shows a partial view in longitudinal section of a mechanical seal assembly according to an embodiment of the invention, FIG. 2 shows a perspectively expanded view of a rotatory force transmission means according to the invention, together with a retainer housing of the mechanical seal assembly of FIG. 1, and FIG. 3 shows a cut partial view of a transmitting ring of the rotatory force transmission means.

Although the invention is preferably used in connection with sterile applications, in particular for sealing fluids having a high degree of purity such as ultra-pure water, it is obvious that the invention is not restricted to this field of application, but may basically be used in an advantageous way for mechanical seals.

Reference numeral 1 in FIG. 1 designates a substantially tubular retainer housing 1 which preferably has a smoothly finished or polished outer periphery without any notches or steps, at which deposits could form. A seal ring 2 held at the retainer housing 1 includes a slip or seal surface 3 which co-operates with a like surface 4 of a stationary seal ring 5 in order to seal a portion at the outer periphery of the seal surfaces 3, 4 with respect to a space at the inner periphery. The seal ring 5 maybe held rotationally fixed at a shaft passage region of a housing (not shown) of a device to be sealed, e.g. a pump, wherein a secondary sealing member 6 creates a sealing between the housing and the seal ring 5. Suitable secondary sealing members for sterile applications are known to the skilled person, such that a detailed explanations is not necessary.

At the side of an axial end (right end in the drawing), a recess 7 is introduced in the retainer housing 1, a groove for receiving an engaging ring 8 made of flexible material being inserted into the outer periphery of said recess. The seal ring 5 is inserted force-fit into the engaging ring 8, such that a rotatory force transmitting connection is created between the seal ring 5 and the retainer housing 1. For the purposes of the present invention, it is not necessary to explain the construction of the engaging ring 8 in more detail.

At the side of the other axial end (left end in the drawing), a further stepped recess 9 is provided in the retainer housing 1 in order to arrange and mount a rotatory force transmission device which is generally designated by reference numeral 10. It is the object of the rotatory force transmission device 10 to connect a mounting ring 12, which may be mounted rotationally fixed on a rotating component (not shown), e.g. a pump shaft, to the retainer housing 1 such that a rotation of the mounting ring 12 causes a like rotation of the retainer housing 1.

The retainer housing 1 is axially movable with respect to the mounting ring 12. Between the mounting ring 12 and the retainer housing 1, a biasing spring 13, e.g. a corrugated spring, is arranged, which has the effect that the axially movable retainer housing 1 is biased against the stationary seal ring 5 in order to retain the co-operating seal surfaces 3, 4 of the seal rings 2, 5 in a sealing engagement with each other. Concerning the detailed structure of corrugated springs, reference is made to BURGMANN, ABC der Gleitringdichtung, 1988, Selbstverlag, page 80.

A secondary sealing member 14 is provided to close the recess 9 toward the outside and to simultaneously create a sealing between the mounting ring 12 and the retainer housing 1 without substantially affecting the axial mobility of the retainer housing 1.

The rotatory force transmission device 10 is shown in FIG. 2 and comprises a transmitting ring (generally designated with reference numeral 15), which is shown in further detail in FIG. 3. The transmitting ring 15 is retained in the recess 9 by press-fit between the outer periphery of the transmitting ring 15 and an adjacent peripheral surface of the recess 9, such that a strong, non-slip, rotatory force transmitting relation is provided between the transmitting ring 15 and the retainer housing 1.

Preferably, the press-fit is obtained by the action of an outer axial force on the transmitting ring 15 by force-fitting into the recess 9, but not as a result of shrinking due to an application of high temperatures. However, the invention is not restricted to a force-fitting of the transmitting ring 15, but also includes a press-fit in the form of a shrink-fit.

As is shown in FIGS. 2 and 3, the transmitting ring 15 comprises a continuous annular basic body 16 having a preferably rectangular cross-section including outer and inner end faces 17, 18 in radial planes. The outer end face 17 creates an abutting surface for the secondary sealing member 15. The basic body 16 further comprises a cylindrical peripheral surface 19, the radial and axial dimensions of which are designed such that the aforementioned press-fit is obtained between said surface and the inner periphery of the recess 9.

A pair of protruding engagement members 20, 20' project from the inner end face 18 of the basic body 16, wherein only one is shown in FIG. 1. The protruding engagement members 20, 20' are arranged along the periphery of the basic body 15 diametrically with respect to each other. Each protruding engagement member 20, 20' may constitute a polygon block having a preferably rectangular outline with flat surfaces and projects from the adjacent end face 18 axially as well as radially by appropriate short distances toward the inside. The upper side of the protruding engagement member 20 is arranged such that the protruding engagement member 20 does not radially exceed the outer periphery 19 of the basic body 16. However, the upper side of the protruding engagement member 20 may also align with the outer periphery 19 of the basic body 16, if desired.

Preferably, the transmitting ring 15 is an integral component, e.g. produced by a metal-cutting processing, made of a metallic material suitable for sterile applications, i.e. having a very low ferrite content of e.g. ≦1%. However, the invention is not limited in this respect; if desired, other suitable materials may be used. In application other than sterile applications, the protruding engagement members 20, 20' may be attached at the basic body 16 of the transmitting ring 15 by means of a suitable joining technology, e.g. by welding or soldering.

As is discernible from FIGS. 1 and 2, the mounting ring 12 comprises, in a tubular axial lug portion 21, a pair of diametrically spaced, slit-shaped, longitudinal recesses or grooves 22, 22', wherein only one is shown in the figure. The recesses 22, 22' extend in an axial direction along a suitable length of the tubular lug portion 21 and start at the inner end face thereof facing the biasing spring 13, at which the biasing spring 13 rests with one end thereof.

The recesses 22, 22' are radially aligned with the protruding engagement members 20, 20' of the transmitting ring 15 and are dimensioned such that the protruding engagement members 20, 20' may protrude into the respective recesses 22, 22', as is shown in FIG. 1, in order to create a coupling and detachable connection between the mounting ring 12 and the transmitting ring 15, enabling a relative axial movement between these components. In particular, a rotatory force is transmitted through a respective lateral flange of the recesses 22, 22' to the protruding engagement members 20, 20'. Due to the rectangular outline of the protruding engagement members 20, 20', a plane engagement with the lateral flanges of the recesses 22, 22' occurs, which, contrary to a linear engagement, results in decreased wear and abrasion in an advantageous manner.

The mounting ring 12 may have an expanded outer end portion 23 including an end face 24 which forms a mounting surface for abutment at a step portion of a rotating component. In the outer periphery of the end portion 23, a suitable sealing member 25 may be arranged in an annular groove, which may sealingly engage with the step portion.

When mounting the seal assembly, the biasing spring 13 is at first inserted into an inner section 9a of the recess 9, said section having a smaller diameter, until an axial end of the spring abuts at the retainer housing 1. Then, the transmitting ring 15 with protruding engagement members 20 facing toward the spring 13 is force-fit into a section 9b of the recess 9, said section having a larger diameter, until the protruding engagement members 20 abut against an inner step surface 25 of the recess. Subsequently, the mounting ring 12 with recesses 22, 22' directed toward the protruding engagement members 20, 20' is inserted from outside, until its inner end face abuts at the spring 13. Hereby, the protruding engagement members 20, 20' enter the recesses 22, 22'. Finally, the sealing member 14 is inserted from outside into the recess 9, until an annular flange at the sealing member snaps into an annular groove provided near the outer end of the recess 9.

In the described embodiment of the invention, a pair of protruding engagement members is provided for symmetry reasons. If desired, only one protruding engagement member or three or more protruding engagement members may be arranged at the transmitting ring. The protruding engagement members do not need to have the mentioned rectangular shape, although this is advantageous in many respects and enables an easier metal-cutting processing. Also other outline configurations may be used, as far as they create lateral retaining surfaces which enable a plane engagement with the lateral flanges of the recesses. In cases in which the retainer housing is not axially movable, only short recesses adapted to the axial dimensions of the protruding members may be included in the mounting ring.

The invention claimed is:

1. A mechanical seal assembly comprising:
   a pair of co-operating seal rings (2, 5), one of which is held rotationally fixed and the other of which is provided to rotate together with a rotating component, wherein one of the seal rings is axially movable and biased by a spring (13) against the other seal ring,
   a retainer housing (1) at which the rotating seal ring (2) is retained near an axial end thereof, the retainer housing having an inner surface and an outer surface,
   a mounting member (12) configured to be mounted rotationally fixed at a rotating member, and
   a rotary force transmission device (10) for transmitting a rotary force between the mounting member (12) and the retainer housing (1),
   wherein the rotary force transmission device (10) comprises a transmitting ring (15) retained in press-fit within a recess (9) in the inner surface of the retainer housing (1) near the other axial end thereof, the transmitting ring (15) including at least one engagement member (20, 20') protruding axially from an inner end face (18) of the transmitting ring (15), and radially inward beyond an inner circumferential face of the transmitting ring, the at least one engagement member (20, 20') engaging in an aligned recess (22) in the mounting member (12).

2. The mechanical seal assembly of claim 1, wherein a pair of engagement members (20, 20') being arranged diametrically offset protrude from the transmitting ring (15), said pair engaging into a pair of recesses (22) in the mounting member (12) aligned thereto.

3. The mechanical seal assembly of claim 1, wherein the engagement member or each engagement member (20, 20') is an integral component of the transmitting ring (15).

4. The mechanical seal assembly of claim 1, wherein the engagement member or each engagement member (20, 20') has plane-like engagement portions facing into an inner circumferential direction.

5. The mechanical seal assembly of claim 4, wherein the engagement member or each engagement member (20, 20') has a polygon outline.

6. The mechanical seal assembly of claim 1, wherein the rotating seal ring (2) is axially movable and the recess or each recess (22) in the mounting member (12) is formed axially slit-shaped.

7. The mechanical seal assembly of claim 1, wherein the engagement member or each engagement member (20, 20') is formed as a polygon block axially and radially protruding from the inner end face (18) of the the transmitting ring (15).

8. The mechanical seal assembly of claim 1, wherein the transmitting ring (15) has an annular body including an outer end face (17) which serves as an abutting surface for an annular sealing member (14) retained at the retainer housing (1).

9. The mechanical seal assembly of claim 1, wherein the spring (13) is disposed between the mounting member (12) and the retainer housing (1).

10. The mechanical seal assembly of claim 1, wherein the transmitting ring (15) has a cylindrical peripheral outer surface (19) having radial and axial dimensions that provide the press-fit between the cylindrical peripheral outer surface (19) and inner periphery of the recess (9).

11. The mechanical seal assembly of claim 1, wherein the engagement member or each engagement member (20, 20') are arranged such that they do not radially exceed a peripheral outer surface (19) of the transmitting ring (15).

12. The mechanical seal assembly of claim 1, wherein the engagement member or each engagement member (20, 20') have an upper side aligned with a peripheral outer surface (19) of the transmitting ring (15).

* * * * *